Feb. 4, 1958      J. P. BARRETT ET AL      2,822,295
RODENT REPELLENT CORDAGE IMPREGNATED WITH DODECYL ALCOHOL
Filed Nov. 1, 1951      4 Sheets-Sheet 1

INVENTORS:
JOHN P. BARRETT AND
ERVIN W. SEGEBRECHT

BY Carl C Batz
ATTORNEY

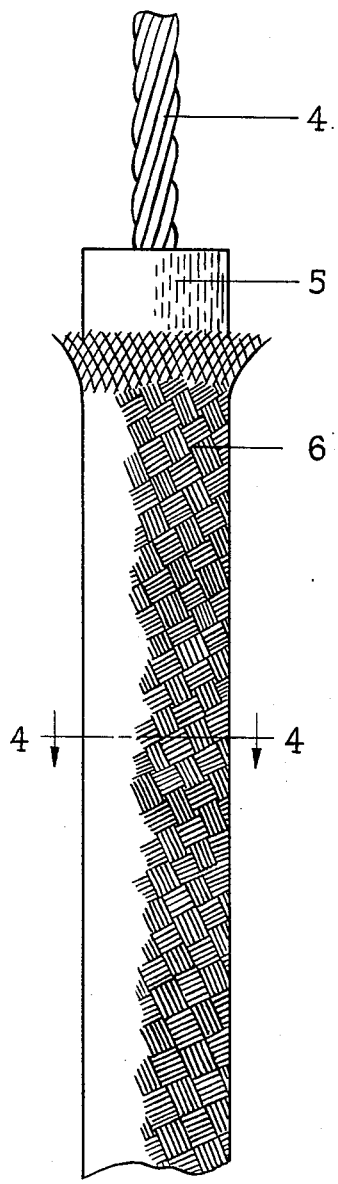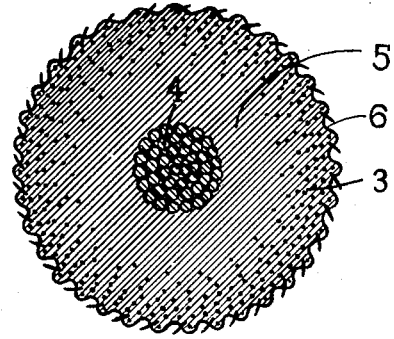

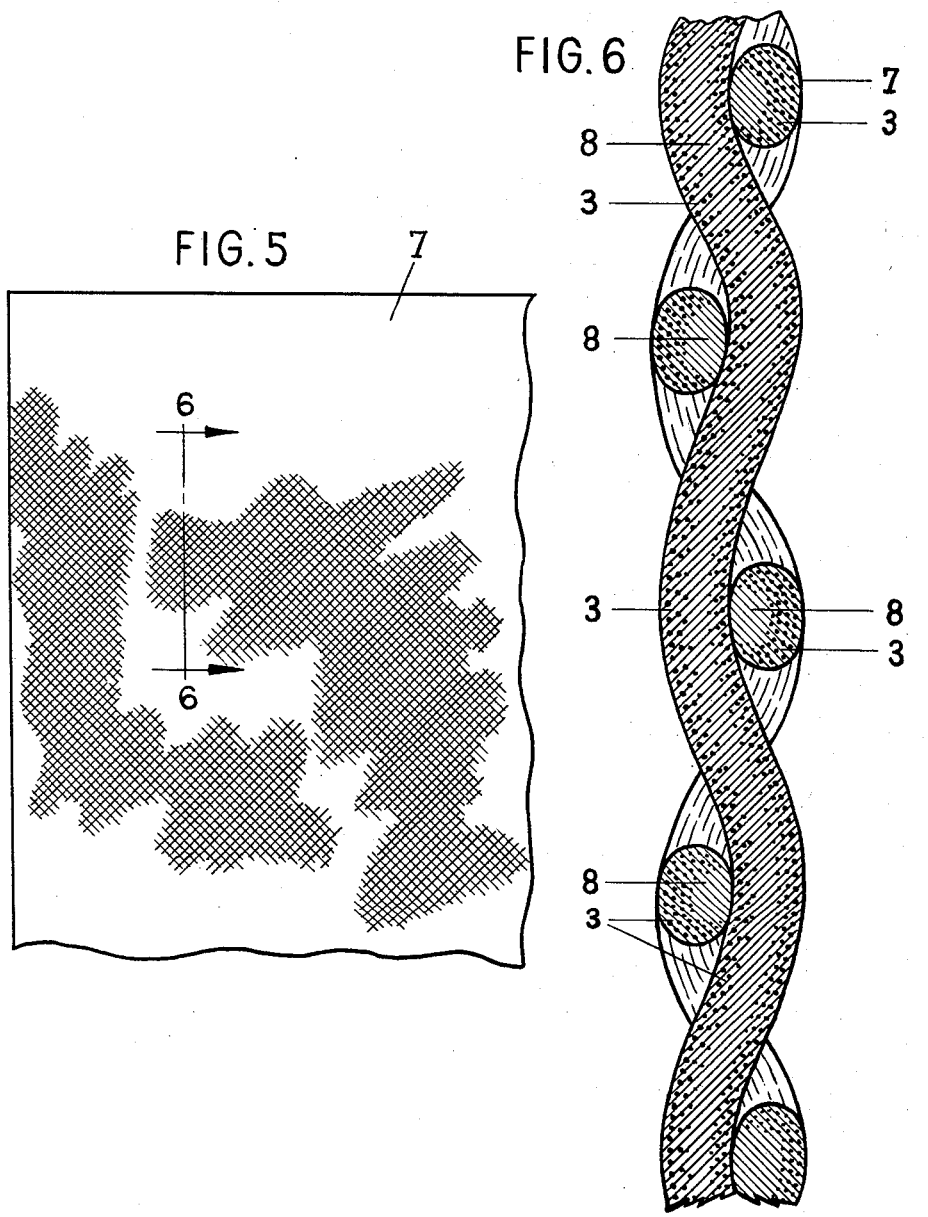

Feb. 4, 1958     J. P. BARRETT ET AL     2,822,295
RODENT REPELLENT CORDAGE IMPREGNATED WITH DODECYL ALCOHOL
Filed Nov. 1, 1951     4 Sheets-Sheet 4

INVENTORS:
JOHN P. BARRETT AND
ERVIN W. SEGEBRECHT

BY *Carl C. Batz*

ATTORNEY

United States Patent Office 2,822,295
Patented Feb. 4, 1958

2,822,295

RODENT REPELLENT CORDAGE IMPREGNATED WITH DODECYL ALCOHOL

John P. Barrett and Ervin W. Segebrecht, Chicago, Ill., assignors to Armour and Company, Chicago, Ill., a corporation of Illinois Application November 1, 1951, Serial No. 254,394

4 Claims. (Cl. 117—138.5)

This invention relates to fabrication materials having rodent repellent characteristics. The invention is especially useful in connection with wrapping and container materials, cordage including binder twine, wrapping cord, ropes and hawsers, and similar rope and twine, electrical and other cables and conductors, and fabrication boards such as paper boards, pressed fibrous boards, paper reinforced boards, fiber boards reinforced with inert filler materials, laminated boards, corrugated paper boards and other boards used in the fabrication of cartons, shipping containers, and boards used in building construction or in the interior finishing of buildings, etc.

The protection of fabrication material and the like against rodent attack and destruction presents a problem of major significance. Great damage is suffered annually because of rodents gnawing through fabrication materials, cordage, electrical insulation and the like. In the case of grains and other food products which are stored in textile bags and other wrappers or containers there is loss resulting from the cutting of holes in such containers by rats and mice. There is similar damage wrought in the case of cordage—as in instances where grain is tied in bundles with binder twine, the cutting of twin by field mice or rats results in a loss of grain and greatly increases the labor required in handling the broken bundles. The damage to ship ropes and other ropes by rodents represents a large annual loss. In the case of electrical insulation, rats, squirrels, and other rodents frequently destroy the insulative material about electrical conductors and thereby create fire hazards.

Attempts to prevent damage by rodents have usually consisted in applying toxic substances or disagreeable tasting substances to the vulnerable article. This is not a practical solution to the problem since the rodents attack readily and accomplish extensive damage before the above substances exert their desired effect. Another common method of extermination is by the use of toxic gases. This method is often ineffective especially in open and inaccessible areas. A further disadvantage of the above chemical materials is that they are usually toxic to humans and domestic animals and cannot therefore be safely employed in connection with food materials. Still a further disadvantage is that certain of the above chemical materials impart undesirable structural characteristics to the treated article as in the case of cordage where certain materials incorporated therein render it stiff and unsatisfactory as a flexible member.

An object of the present invention is to provide fabrication material which is rendered repellent to rodents to the extent that rodents do not approach the material or attempt to gnaw it. Another object is to provide fabrication material carrying dodecyl alcohol which repels rodents to the extent that it halts the rodents at a distance from the material, yet it has no unpleasant or undesirable effects upon the human senses. Yet another object is to provide cordage which is waterproofed and made repellent to rodents while at the same time preserving its high flexibility. Still another object is to provide a rodent-repellent electrical insulation or electrical cable which is repellent to the degree that the rodent does not even approach the cable. Still another object is to provide a rodent-repellent fabrication board which does not require that the rodent contact the board in order to be deterred therefrom. Still another object is to provide a container which is effective for repelling rodents without requiring that the rodents make contact with the container. Still another object is to provide a container or wrapper adapted to receive food products and in which is incorporated a rodent-repellent substance having no disagreeable odor to the human olfactory senses but which is effective in keeping rodents away from the container, while at the same time exerting no undesirable effect upon the food contents of the container. Other specific objects and advantages will appear as the specification proceeds.

For convenience of illustration, our invention will be described hereinafter with respect to cordage, textile fibers, electrical cable and board materials, but it will be understood that our invention is not limited to these specific articles but is of use in connection with fabrication materials in general.

Illustrative embodiments of our invention are shown in the accompanying drawing, in which Figure 1 is a plan view of a cord containing rodent-repellent material in accordance with our invention;

Figure 3 is a broken plan view of a cable embodying our invention, and Figure 4 is an enlarged transverse sectional view thereof, the section being taken as indicated at line 4—4 of Figure 3;

Figure 5 is a broken plan view of a burlap bag serving to illustrate the invention;

Figure 6 is a greatly enlarged sectional view of the bag, the section being taken as indicated at line 6—6 of Figure 5;

Figure 1:
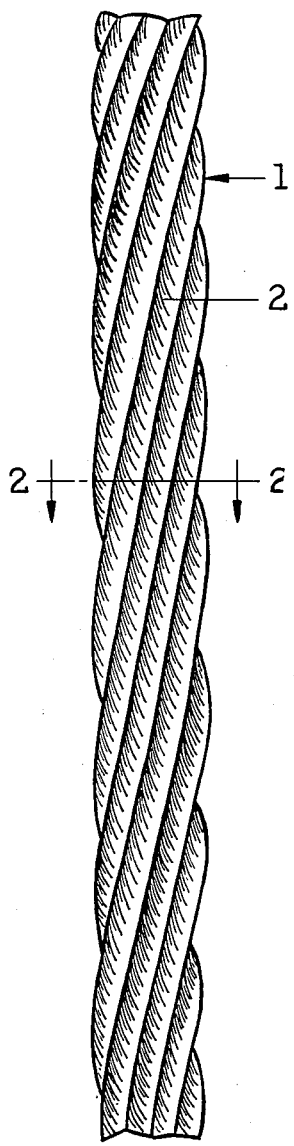
Figure 2:
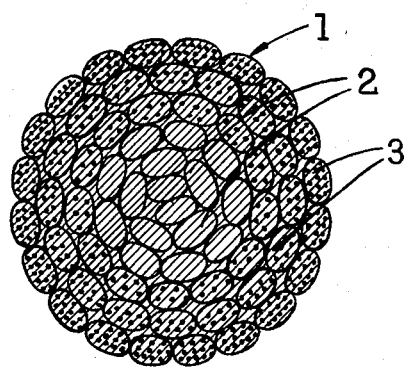
Figure 2 is an enlarged transverse sectional view of the cord, the section being taken as indicated at line 2—2 of Figure 1.

In one embodiment of our invention, as illustrated in Figures 1 and 2, the numeral 1 designates a cord formed by twisted strands 2 of thread. The cord is saturated with dodecyl alcohol, which is indicated schematically by the dots 3 shown in Figure 2.

To render the cordage rodent-repellent, we incorporate in the cordage a straight chain aliphatic alcohol having preferably 12 carbon atoms in its alkyl chain. The dodecyl alcohol may be applied to the cord by spraying the same in liquid form thereon or by dipping the cord into the alcohol. It will be understood that any desired method for applying the alcohol to the cord may be employed. If desired, the alcohol may be mixed with the fibers prior to the forming of the stranded cord, etc.

The dodecyl alcohol may be conveniently applied to the cordage in an admixture of mineral oil and dodecyl alcohol. For example, the alcohol may be mixed with, preferably, a heavy non-volatile mineral oil or hydrocarbon with the alcohol present in the percentage of 3 to 5%, and preferably in the percentage of 5 to 10% by weight. Also, the alcohol may be mixed with melted paraffin and applied in a molten condition to the cordage.

A much larger proportion of dodecyl alcohol may be employed and excellent results have been obtained by using such cordage oil (heavy mineral or hydrocarbon oil) carrying dodecyl alcohol at about 10%.

If the dodecyl alcohol is used alone, the same percentage as indicated above may be used for the fiber being treated, the cordage oil, of course, being omitted. We have found that effective results are obtained when the dodecyl alcohol is from 3 to 10% by weight of the treated cordage fiber, but it will be understood that any higher proportion of the alcohol may be used if desired.

The use of heavy mineral oil or hydrocarbon or molten paraffin is useful not only in causing the alcohol to penetrate effectively through the body of the cordage but also in waterproofing the cordage.

As a specific example, cordage was treated in the following manner:

The cord was dipped in a solution containing 10% dodecyl alcohol and 90% hydrocarbon cordage oil. The results are given in the following table:

|  | Grams |
|---|---|
| Wt. of cordage with 10% dodecyl alcohol in cordage oil | 16.83 |
| Wt. of cordage | 11.03 |
| Wt. of solution taken up by cordage | 5.80 |
| Wt. of dodecyl alcohol on cordage | [1].58 |
| Wt. of cordage oil on cordage | 5.22 |

[1] 10% of total.

The resulting cord was found to be highly waterproof while also being rodent-repellent for an indefinite period of time.

As a further embodiment of our invention, Figures 3 and 4 show a conductor 4 consisting of a plurality of wires, as shown in Figure 4, the wires being enclosed by an insulation coating or composition 5. Around the insulation composition 5 extends a fabric sheath 6. The dodecyl alcohol is indicated, diagrammatically, by dots 3, as shown more clearly in Figure 4.

As a rodent-repelling material to be carried by the insulation or sheath of the cable, we employ a straight chain aliphatic alcohol having preferably 12 carbon atoms in the alkyl chain. The dodecyl alcohol may be applied to the composition 5 or incorporated therein, or it may be applied to the sheath 6. The alcohol is applied preferably in liquid form as a spray to the outer surface of the insulation 5 or to the sheath 6, or if desired, these parts may be dipped within a liquid body of dodecyl alcohol. Further, if desired, the dodecyl alcohol may be mixed with the composition materials forming the insulation body 5 and prior to the application of this material to the conductor 4.

The conductor 4 may be formed by a single wire or by a plurality of wires, as illustrated. The composition 5 may consist of pitch, such as asphalt, bitumen, or tar, in molten condition, and the material when in a plastic condition may be applied about the conductor 4. Various resins and other suitable coating compositions may also be employed.

The alcohol is effective when applied as a coating upon the outer surface of the insulation 5, and the fabric sheath 6 is useful in retaining the film upon the insulation.

The proportion of the alcohol to the materials used in forming the insulation 5 may be varied widely. Good results have been obtained when the percentage of the alcohol is from 2 to 10% by weight of the coating material, but we prefer to employ a composition in which the dodecyl alcohol is from 5 to 10% by weight.

In a specific example, one-quarter part by weight of dodecyl alcohol was dissolved in 10 parts by weight of molten asphalt, and the solution allowed to cool. When the solution became plastic, it was applied to copper wire to coat the wire and to form the insulation coating 5. This insulation was found highly effective in repelling rodents. It will be understood that the dodecyl alcohol may be used in any larger percentage as desired, but it is found that the larger amounts are not necessary for accomplishing the results described herein.

When the alcohol is applied to the outer surface of the insulation 5 or sheath 6, it is found that the alcohol provides a thin protective film which remains effective for indefinite periods of time in repelling rodents, and this obtains even though the film be made extremely tenuous or thin.

In another embodiment of our invention as shown in Figures 5 and 6, the numeral 7 designates a burlap bag which is woven from fiber strands 8, as shown in detail in Figure 6. The strands 8 are shown provided with a rodent-repellent substance which is indicated diagrammatically by dots 3 (Figure 6).

As a rodent-repelling substance effective for incorporation in the bag, we employ a straight-chain aliphatic alcohol having preferably 12 carbon atoms in the alkyl chain. Dodecyl alcohol is particularly effective in combination with such textile containers in that it remains permanently in the fibers and is effective for an indefinite period in keeping rodents from approaching the bag. Apparently the dodecyl alcohol has an inhibiting effect upon the olfactory senses of the rodents (or senses other than the sense of taste) so that the rodents remain away from the bag or other treated article, until motivated by extreme hunger, and even then do little damage. Further, the dodecyl alcohol exerts a lubricating effect on the fibers and when used in conjunction with cordage oil or heavy non-volatile hydrocarbons renders the bag resistant to water.

While a burlap bag has been set out in the drawing as illustrative of a container to which the invention is applicable, it will be understood that any textile containers or articles formed of cotton, jute, wool or other fibers may be used and the containers may be formed by a wrapper or other structure enclosing food and other products and secured therearound.

The dodecyl alcohol may be used in any desirable quantity but we prefer to use it in a percentage greater than 2% by weight with respect to the textile container material being treated. A large percentage may be used if desired but it is found that small percentages are effective for the purposes which have been described.

The dodecyl alcohol may be applied to the fibers prior to their being woven into the container structure or may similarly be admixed with oil and combined with such fibers prior to the container forming step.

The dodecyl alcohol may be applied to the exterior of the bag or to the interior thereof so as to form a thin film thereon and it is found that the film clings tenaciously to the strand fibers and remains united thereto for a long period of time. When the dodecyl alcohol is applied alone to the container, we prefer to employ from about 2% to 10% by weight based upon the weight of the textile being treated.

Figure 7:
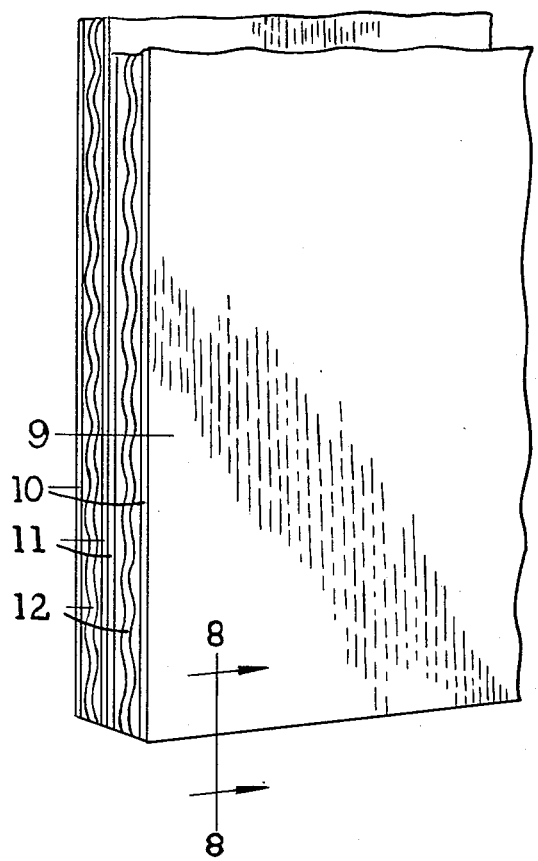
Figure 7 is a broken perspective view of rodent-repellent double corrugated fiber board.
Figure 8:
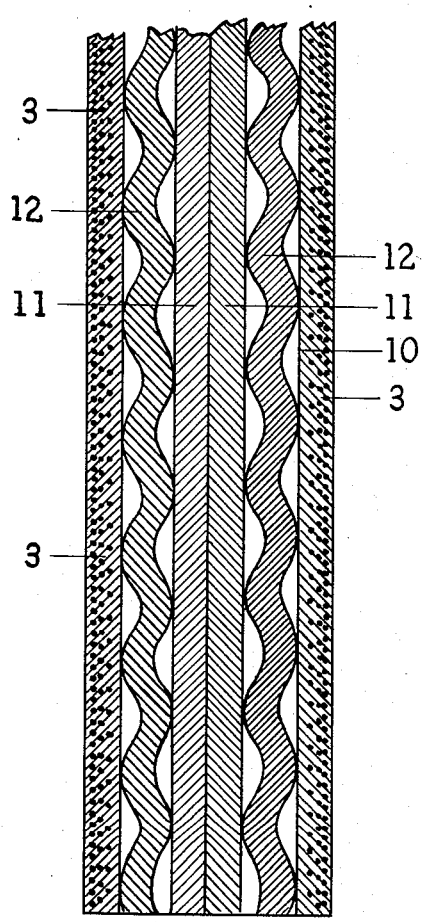
Figure 8 is a broken enlarged detailed sectional view of the board, the section being taken as indicated at line 8—8 of Figure 7.

In a further embodiment of our invention, as shown in Figures 7 and 8, the fiber board 9 is formed by the bringing together and uniting of two corrugated boards. Each of the boards has an outer ply 10 of paper and an inner ply 11 of paper. A corrugated fiber strip 12 extends between the plies 10 and 11 and is preferably united thereto by adhesive. The rodent-repellent substance is carried by exterior surfaces of the double corrugated board and also by interior surfaces as illustrated diagrammatically by the dots 3.

It will be understood that the rodent-repellent substance may be applied to the board at any desired point, either as a surfacing film or as an impregnating material held within the interior of the board.

As a rodent-repellent substance, which is effectively incorporated in the board, we employ a straight-chain aliphatic alcohol having preferably 12 carbon atoms in its alkyl chain. Dodecyl alcohol is particularly effective in combination with the board because of its penetrating qualities and because of its tenacious adherence to the fibers, and further because of its ability to prevent rodents from approaching the board. As is also the case when dodecyl alcohol is incorporated with cordage, textile fibers, electrical cable, etc., the dodecyl alcohol apparently acts upon the olfactory senses other than the sense of taste and prevents the rodents from coming into contact with the board. Thus an initial tear or cut into the containers, etc., which might become a leak hole, is avoided.

The fabrication board may be of any suitable construction. It may be of single or double corrugated fiber board used for the forming of containers, etc. It may consist solely of fiber board compressed into flat strips, etc., or it may consist of cellulosic sheets between which inert filler material is placed. The board may be formed of wood or laminations of wood or other material united by adhesive, resin, etc.

The dodecyl alcohol may be applied in liquid form, by spraying, dipping, etc., or by any other convenient method. The board may thus be provided with an exterior and interior film. If desired, the dodecyl alcohol may be incorporated in the adhesive or resin which is employed for fabricating the corrugated board, laminated board, etc. The dodecyl alcohol is effective even though it exists in the resin or adhesive in the interior of the board and small amounts of 2% or more by weight have been effective in preventing the approach of rodents.

Excellent results have been obtained by combining the dodecyl alcohol with heavy mineral oil, hydrocarbon oils which are non-volatile, and also with melted paraffin. The oils serve as a carrier for distributing the dodecyl alcohol in minimum amounts while at the same time rendering the structure water-resistant.

By way of specific example, one-half of a part by weight of dodecyl alcohol was mixed with ten parts of melted paraffin and applied as a hot solution to a corrugated board employed for forming a carton. The mixture when cooled formed a waterproof finish about the carton which at the same time was found to resist attack by field mice and wild rats for substantially indefinite periods.

In the oil mixtures good results were obtained where the dodecyl alcohol was employed in equal parts by weight with the oil. However, much smaller quantities of dodecyl alcohol were found to be effective and good results were obtained when the dodecyl alcohol was in percentages from 2% to 3% to 10% of the oil. We prefer to employ the dodecyl alcohol in the range of 5% to 10% by weight of the oil.

When the dodecyl alcohol is used alone, any desired amount may be employed and the film formed upon the board may be extremely thin. For coating a paper sheet, it is found that the dodecyl alcohol is effective when used in percentages as low as 2% by weight with respect to the paper sheet. As already indicated the percentages are not critical and may be used in varying quantities above the minimum as desired.

The rodent repellency of the above materials was tested, usually by interposing, for comparison, barriers of treated or untreated materials between a supply of food and rodents, preferabbly wild rats, so as to separate the rodents from the food and to make it necessary for the rodents to pierce the barrier in order to reach the food.

As a specific example of the effectiveness in repelling rodents, of a textile container, the following may be set out: A textile container was dipped in a solution of 20% dodecyl alcohol—80% isopropyl alcohol. The treated container or bag was filled with compressed pellets of rat food diet and placed in a cage containing two wild rats which had not eaten for 24 hours. It took 42 hours for the rats to pierce the bagging material. With untreated bagging, the rats pierced it in less than 12 hours.

Other similar tests of the effectiveness of our rodent-repellent materials were made in accordance with the procedure described below. A wire cage was provided with a central wire portion having windows therein. The windows were first covered by barriers which in some of the tests were untreated and in other of the tests were treated with dodecyl alcohol in the manner above indicated. Then wild rats were placed in one of the compartments while food was placed in the other compartment so that the rats could have access to the food only by gnawing or piercing through a barrier and entering the food compartment by way of the pierced barrier.

Using this latter test procedure, electrical cable was tested as follows: The windows were first covered by barriers formed with untreated electrical cables, and it was found that the rats gnawed away the insulation of the barriers within a period of 12 hours. Barriers were then formed of cables treated in accordance with the invention as described above, and it was found that the barriers remained intact after long periods, so that most of the tests had to be discontinued to prevent starvation of the rats since they could not cut through the wire anyway.

The same test procedure was carried out with cordage and in the case of tests in which untreated cords were employed to form a barrier, it was found that the rats chewed through the barriers in less than 12 hours. In the tests where the barriers were formed of cords treated with dodecyl alcohol in accordance with our invention, the rats were confined for a 36 to 48 hour period without cutting their way through the barriers.

The above barrier tests were also carried out with corrugated paper, laminated board, and various types of wall construction board. In the case of untreated papers or boards, the rats cut their way through usually within twelve hours. Similar boards were then treated with dodecyl alcohol as heretofore described and placed over the windows. These barriers were effective for almost substantially indefinite periods in preventing the rats from entering the food compartment. Many of the tests were discontinued to prevent starvation of the rats.

A noteworthy result of the tests was that the rats were inhibited from attacking the barrier materials without coming in contact therewith and remained at a distance from the materials. While these materials treated with dodecyl alcohol had no unpleasant odor so far as human olfactory senses are concerned and had no other undesirable effect upon the human senses, nevertheless (as mentioned hereinbefore) they seemed to have an inhibiting effect either on the olfactory senses of the rat or some other sense other than the sense of taste because the rats were inhibited without contacting the treated materials.

This application is a continuation in part of each of the prior applications bearing filing date of June 14, 1949, such applications being Serial No. 99,070 for Rodent-Repellent Cordage, Serial No. 99,071 for Rodent-Repellent Electrical Cable, Serial No. 99,072 for Rodent-Repellent Wrapper or Container, and Serial No. 99,073 for Fabrication Board, each application now abandoned.

While in the foregoing specification, we have set forth specific structures in detail for the purpose of illustrating the invention, it will be understood that such details may be varied widely by those skilled in the art without departing from the spirit of our invention.

We claim:

1. Rodent-repellent cordage consisting of cordage impregnated with dodecyl alcohol.
2. Binder twine impregnated with dodecyl alcohol and non-volatile hydrocarbon oil.
3. A process for rendering cordage highly repellent to rodents which comprises incorporating with said cordage dodecyl alcohol.
4. A process for rendering binder twine highly repellent to rodents which comprises incorporating with said binder twine dodecyl alcohol.

References Cited in the file of this patent

UNITED STATES PATENTS

| | | |
|---|---|---|
| Re. 20,869 | Bousquet | Oct. 4, 1938 |
| 255,040 | Skinner | Mar. 14, 1882 |
| 1,653,710 | Kitchen | Dec. 27, 1927 |
| 2,043,941 | Williams | June 9, 1936 |
| 2,222,638 | Szilard | Nov. 26, 1940 |
| 2,254,665 | Ralston et al. | Sept. 2, 1941 |
| 2,547,722 | Stewart | Apr. 3, 1951 |
| 2,578,595 | Ralston et al. | Dec. 11, 1951 |